(12) United States Patent
Jagannathan et al.

(10) Patent No.: US 11,928,849 B2
(45) Date of Patent: Mar. 12, 2024

(54) ACTION-OBJECT RECOGNITION IN CLUTTERED VIDEO SCENES USING TEXT

(71) Applicant: International Business Machines Corporation, Armonk, NY (US)

(72) Inventors: Anupama Jagannathan, Yorktown Heights, NY (US); Anne Elizabeth Gattiker, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 17/668,526

(22) Filed: Feb. 10, 2022

(65) Prior Publication Data

US 2022/0165047 A1    May 26, 2022

Related U.S. Application Data

(63) Continuation of application No. 17/062,896, filed on Oct. 5, 2020, now Pat. No. 11,270,147.

(51) Int. Cl.
    *G06V 10/46*     (2022.01)
    *G06V 10/20*     (2022.01)
    (Continued)

(52) U.S. Cl.
    CPC ............ *G06V 10/23* (2022.01); *G06V 10/255* (2022.01); *G06V 10/44* (2022.01); *G06V 20/46* (2022.01)

(58) Field of Classification Search
    CPC ........ G06V 10/23; G06V 10/44; G06V 20/46; G06V 10/255
    See application file for complete search history.

(56) References Cited

U.S. PATENT DOCUMENTS

| 6,310,629 B1 | 10/2001 | Muthusamy et al. |
| 7,797,282 B1 | 9/2010 | Kirshenbaum et al. |

(Continued)

FOREIGN PATENT DOCUMENTS

| CN | 108229445 A | 6/2018 |
| CN | 108647591 A | 10/2018 |

(Continued)

OTHER PUBLICATIONS

Divvala, Santosh K. et al., "Learning Everything about Anything: Webly-Supervised Visual Concept Learning", Proceedings of the IEEE Conference on Computer Vision and Pattern Recognition, 8 pages, Jun. 2014.

(Continued)

*Primary Examiner* — Sam Bhattacharya
(74) *Attorney, Agent, or Firm* — Stephen J. Walder, Jr.; Caleb Wilkes

(57) ABSTRACT

A mechanism is provided to implement an action-object interaction detection mechanism for recognizing actions in cluttered video scenes. An object bounding box is computed around an object of interest identified in a corresponding label in an initial frame where the object of interest appears in the frame. The object bounding box is propagated from the initial frame to a subsequent frame. For the initial frame and the subsequent frame: the object bounding boxes of the initial frame and the subsequent frame are refined and cropped based on the associated refined object bounding boxes. The set of cropped frames are processed to determine a probability that an action that is to be verified from the corresponding label is being performed. Responsive to determining the probability is equal to or exceeds a verification threshold, a confirmation is provided that the action-object interaction video performs the action that is to be verified.

20 Claims, 5 Drawing Sheets

(51) Int. Cl.
  *G06V 10/22* (2022.01)
  *G06V 10/44* (2022.01)
  *G06V 20/40* (2022.01)

(56) References Cited

U.S. PATENT DOCUMENTS

| | | | |
|---|---|---|---|
| 8,620,022 | B2 | 12/2013 | Jeong et al. |
| 9,616,568 | B1 | 4/2017 | Russell |
| 9,740,956 | B2 | 8/2017 | Chen et al. |
| 10,121,076 | B2 | 11/2018 | Chakraborty et al. |
| 10,121,256 | B2 | 11/2018 | Zhong et al. |
| 10,198,818 | B2 | 2/2019 | Varadarajan et al. |
| 2016/0005281 | A1 | 1/2016 | Laska et al. |
| 2016/0300121 | A1 | 10/2016 | Chertok et al. |
| 2019/0022863 | A1 | 1/2019 | Kundu et al. |
| 2019/0220525 | A1 | 7/2019 | Song et al. |
| 2021/0287006 | A1 | 9/2021 | Feng et al. |
| 2021/0365687 | A1 | 11/2021 | Starson et al. |
| 2022/0076424 | A1 | 3/2022 | Shin et al. |
| 2022/0083767 | A1* | 3/2022 | Subramanian ..... G06Q 30/0201 |

FOREIGN PATENT DOCUMENTS

| | | |
|---|---|---|
| CN | 108765450 A | 11/2018 |
| CN | 109063723 A | 12/2018 |
| CN | 109492581 A | 3/2019 |
| CN | 110348312 A | 10/2019 |
| CN | 111401205 A | 7/2020 |
| WO | WO2017/201676 A1 | 11/2017 |
| WO | WO2020/020472 A1 | 1/2020 |
| WO | WO2020/020474 A1 | 1/2020 |

OTHER PUBLICATIONS

Sun, Yan et al., "Image Target Detection Algorithm Compression and Pruning Based on Neural Network", Computer Science and Information Systems 18.2:499-516, 18 pages, Jan. 2021.
Ye, Yuancheng et al., "Discovering Spatio-Temporal Action Tubes", Journal of Visual Communication and Image Representation, 1;58:515-24, 10 pages, Jan. 2019.
Notice of acceptance for patent application and Bibliographic Attachment from IP Australia dated Aug. 23, 2023 for Application No. 2021356255, 3 pages.
Hou, Rui et al., "Tube Convolutional Neural Network (T-CNN) for Action Detection in Videos", arXiv:1703.10664v3 [cs.CV], Aug. 2, 2017, 11 pages.
International Search Report and Written Opinion dated Dec. 24, 2021 for International Application No. PCT/IB2021/058259, 9 pages.
List of IBM or Patent Applications Treated as Related (Appendix P), Feb. 9, 2022, 2 pages.
Carreira, Jao et al., "Quo Vadis, Action Recognition? A New Model and the Kinetics Dataset", 2017 IEEE Conference on Computer Vision and Pattern Recognition (CVPR), Jul. 2017, 10 pages.
Carreira, Joao et al., "Quo Vadis, Action Recognition? A New Model and the Kinetics Dataset", IEEE Conference on Computer Vision and Pattern Recognition (CVPR), Jul. 2017, 10 pages.
Chao, Yu-Wei et al., "Learning to Detect Human-Object Interactions", 2018 IEEE Winter Conference on Applications of Computer Vision (WACV), Mar. 2018, 9 pages.
Chao, Yu-Wei et al., "Learning to Detect Human-Object Interactions", 2018 IEEE Winter Conference on Applications of Computer Vision (WACV), Mar. 2018, 10 Pages.
Deng, Jia et al., "ImageNet: A Large-Scale Hierarchical Image Database", 2009 IEEE Conference on Computer Vision and Pattern Recognition, Jun. 20, 2009 to Jun. 25, 2009, Miami Florida, 8 pages.

Deng, Jia et al., "Imagenet: A large-scale hierarchical image database", 2009 IEEE Conference on Computer Vision and Pattern Recognition, Jun. 2009, 8 pages.
Fathi, Alireza et al., "Modeling Actions through State Changes", In Proceedings of the 2013 IEEE Conference on Computer Vision and Pattern Recognition (CVPR '13), Jun. 23, 2013-Jun. 28, 2013, 8 pages.
Filipovych, Roman et al., "Recognizing Primitive Interactions by Exploring Actor-Object States", In IEEE International Conference on Pattern Recognition (CVPR), Alaska, Jun. 2008, 7 pages.
Hariharan, Bharath et al., "Low-shot Visual Recognition by Shrinking and Hallucinating Features", ICCV 2017 : International Conference on Computer Vision, Oct. 22, 2017-Oct. 29, 2017, Venice, Italy, 10 pages.
He, Kaiming et al., "Deep residual learning for image recognition", In Proceedings of the IEEE conference on computer vision and pattern recognition, Jun. 2016, pp. 770-778.
Held, David et al., "Learning to Track at 100 FPS with Deep Regression Networks", The 14th European Conference on Computer Vision ECCV2016, Oct. 2016, 17 pages.
Jagannathan, Anupama et al., Pending U.S. Appl. No. 17/062,896, filed Oct. 5, 2020, titled "Action-Object Recognition in Cluttered Video Scenes Using Text", 43 pages.
Jagannathan, Anupama et al., Pending U.S. Appl. No. 17/244,476, filed Apr. 29, 2021, titled "Object Dataset Creation or Modification Using Labeled Action-Object Videos", 64 pages.
Lewis, J.P. , "Fast Template Matching", Vision Interface 95, Canadian Image Processing and Pattern Recognition Society, Quebec City, Canada, May 15-19, 1995, 4 pages.
Lin, Tsung-Yi et al., "Focal Loss for Dense Object Detection", 2017 IEEE International Conference on Computer Vision (ICCV), Oct. 2017, 9 pages.
Lin, Tsung-Yi et al., "Microsoft COCO: Common Objects in Context", ECCV: European Conference on Computer Vision, Oct. 2016, 15 pages.
Monfort, Matthew et al., "Moments in Time dataset: one million videos for event understanding", IEEE Transactions on Pattern Analysis and Machine Intelligence (PAMI) Oct. 2019, 17 pages.
Monfort, Matthew et al., "Moments in Time Dataset: one million videos for event understanding", IEEE Transactions on Pattern Analysis and Machine Intelligence, vol. 41, Dec. 4, 2019, 8 pages.
Princeton University, , "WordNet | A Lexical Database for English", Princeton University "About WordNet." WordNet. Princeton University. 2010. https://wordnet.princeton.edu/, downloaded from the internet on Jan. 12, 20201, 4 pgs.
Ratner, Alexander et al., "Data Programming: Creating Large Training Sets, Quickly", Thirtieth Conference on Neural Information Processing Systems NeurIPS 2016, Dec. 2016, 27 pages.
Selvaraj, R. R. et al., "Grad-CAM: Visual Explanations from Deep Networks via Gradient-based Localization", In The IEEE International Conference on Computer Vision (ICCV), Oct. 2017, 9 pages.
Shi, Zhiyuan et al., "Weakly-Supervised Image Annotation and Segmentation with Objects and Attributes", Computing Research Repository (CoRR), Apr. 2017, 14 pages.
Szegedy, Christian et al., "Inception-v4, Inception-ResNet and the Impact of Residual Connections on Learning", Proceedings of the Thirty-First AAAI Conference on Artificial Intelligence (AAAI-17), Feb. 2017, 7 pages.
Yao, Benspeng et al., "Recognizing Human-Object Interactions in Still Images by Modeling the Mutual Context of Objects and Human Poses", IEEE Transactions on Pattern Analysis and Machine Intelligence, vol. 34, No. 9, Sep. 2012, pp. 1691-1703.
Zhou, Bolei et al., "Temporal Relational Reasoning in Videos", Proceedings of the European Conference on Computer Vision (ECCV), Sep. 2018, 16 pages.

\* cited by examiner

ACTION-OBJECT RECOGNITION IN CLUTTERED VIDEO SCENES USING TEXT

BACKGROUND

The present application relates generally to an improved data processing apparatus and method and more specifically, to mechanisms for improving action-object recognition in cluttered video scenes by utilizing text.

The process of training a machine learning (ML) model or a deep learning (DL) model involves providing an ML or DL algorithm (that is, the learning algorithm) with training data to learn from. The term "ML model" or "DL model" refers to the model artifact that is created by the training process. The training data must contain the correct answer, which is known as a target or target attribute. The learning algorithm finds patterns in the training data that map the input data attributes to the target (the answer that you want to predict) and it outputs an ML or DL model that captures these patterns.

SUMMARY

This summary is provided to introduce a selection of concepts in a simplified form that are further described herein in the Detailed Description. This summary is not intended to identify key factors or essential features of the claimed subject matter, nor is it intended to be used to limit the scope of the claimed subject matter.

In one illustrative embodiment, a method, in a data processing system comprising at least one processor and at least one memory, the at least one memory comprising instructions that are executed by the at least one processor to configure the at least one processor to implement an action-object interaction detection mechanism for recognizing actions in cluttered video scenes. The method comprises computing an object bounding box around an object of interest identified in the corresponding label in an initial frame of a set of frames in the action-object interaction video where the object of interest appears in the frame in response to receiving an action-object interaction video with a corresponding label. The method propagates the object bounding box from the initial frame to a subsequent frame of the set of frames. For the initial frame and the subsequent frame with an object bounding box in the action-object interaction video: the method refines the object bounding boxes of the initial frame and the subsequent frame using knowledge of the object of interest thereby forming associated refined object hounding boxes; and crops the initial frame and the subsequent frame based on the associated refined object bounding boxes thereby forming a set of cropped frames. The method processes the set of cropped frames in a same order as in the action-object interaction video to determine a probability that an action that is to be verified from the corresponding label is being performed. The method then provides a confirmation that the action-object interaction video performs the action that is to be verified in response to determining the probability that the action that is to be verified from the corresponding label is equal to or exceeds a verification threshold.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
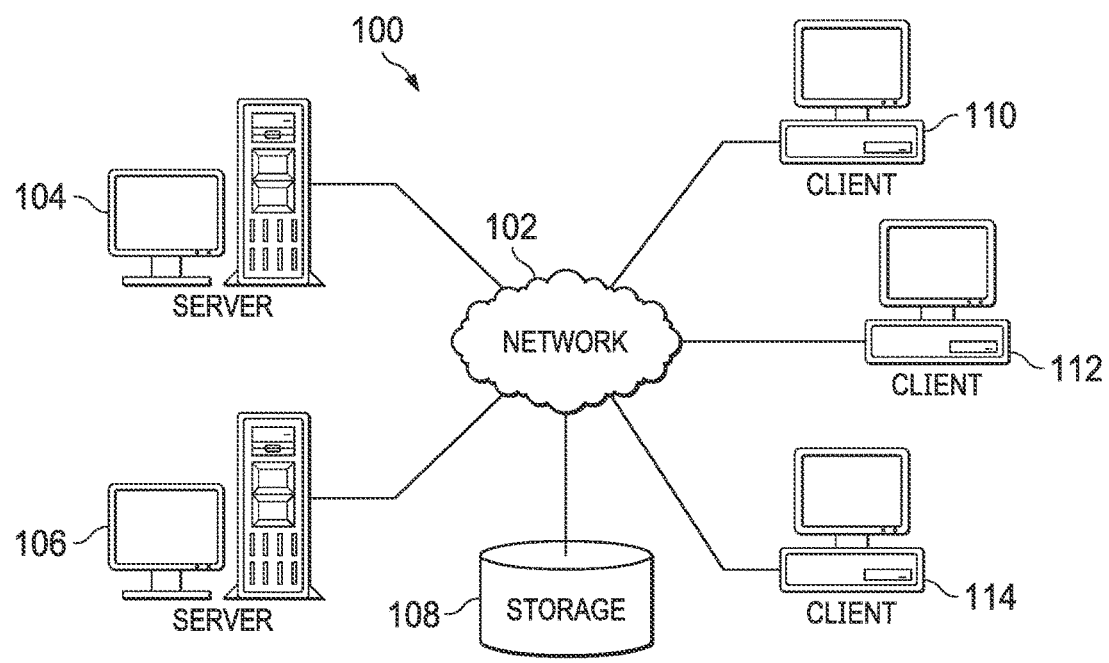
FIG. 1 is an example diagram of a distributed data processing system in which aspects of the illustrative embodiments may be implemented.

Deep learning has revolutionized computer vision. Supervised deep learning involves training complex neural network models using large labeled datasets.

There exist large labeled training datasets such as ImageNet, Microsoft® Common Objects in Context (MS-COCO) and Moments in Time for object classification, object detection and action recognition respectively. One drawback of deep learning models is that their performance suffers when applied to data whose feature distribution is different from the training data. While this problem is typically addressed by transfer learning or domain adaptation based techniques, each of these techniques require a significant amount of labeled training data to be successful. In an enterprise setting, it is expensive to annotate client data with labels. Furthermore, client data differs from training data in available datasets such as Moments in Time, which contains over 300 action classes with over 1000 examples per class and attempts to capture real-world action. In such a scenario, it is desirable to use neural network models pre-trained on existing datasets without having to do domain-specific adaptation.

An important class of action recognition problems from video is those where an action is being performed on an object, and where a text label accompanies the video. Such a text label could be, for example, an instruction, such as "open box." It is desirable to have a method to determine whether or not the video shows the action "open" knowing the expected object is a box. Correctly labeling the action taking place in a video is an important problem with applications in security, compliance verification, and the like.

The illustrative embodiments provide mechanisms that utilize a non-data intensive approach to action recognition from video in cluttered scenes with attention on action-object interaction by leveraging existing datasets. It may be noted that the terms 'recognition' and 'classification' are used interchangeably throughout the text. This approach leverages existing models pre-trained on large datasets to classify action-object presence in previously unseen data, through an inference-based approach. In the presence of clutter, the mechanisms focus attention on the action-object interaction.

The mechanisms improve action recognition accuracy over the state of the art in the special circumstance where there is knowledge of the object being acted upon. The mechanisms do not require task-specific data for fine-tuning or domain adaptation for action classification. Furthermore, the mechanisms work on previously unseen action-object interactions arising from state changes to an object during the course of an action, which is significant for use cases such as action compliance verification.

The strength of the non-data intensive approach comes from focusing attention on the action-object interaction. Current literature indicates that action-object interaction is well studied on image datasets such as MS-COCO using approaches such as RetinaNet. Such approaches and datasets are inadequate for real-world action recognition from video. Also, for real applications, even a dataset as extensive as ImageNet®, falls short in terms of the number of examples that capture the various states of objects, such as the states of the box when "opening" a box. Furthermore, the state-of-the-art action classifiers could need additional video examples for fine tuning or domain adaptation in order to recognize actions being performed on objects that are not sufficiently covered in large action classification datasets.

The mechanisms of illustrative embodiments provide an improvement over the current action-object recognition by identifying an object in varying states through an automated method for finding an initial seed bounding box tor the object. The mechanisms refine the bounding box for the object to include context around the object, as opposed to a tight bounding box. Object detectors, in contrast, often output tight bounding boxes. The inclusion of context around the object is important for improved action-object recognition, compared to the state of the art.

Before beginning the discussion of the various aspects of the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a," "at least one of," and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

Figure 2:
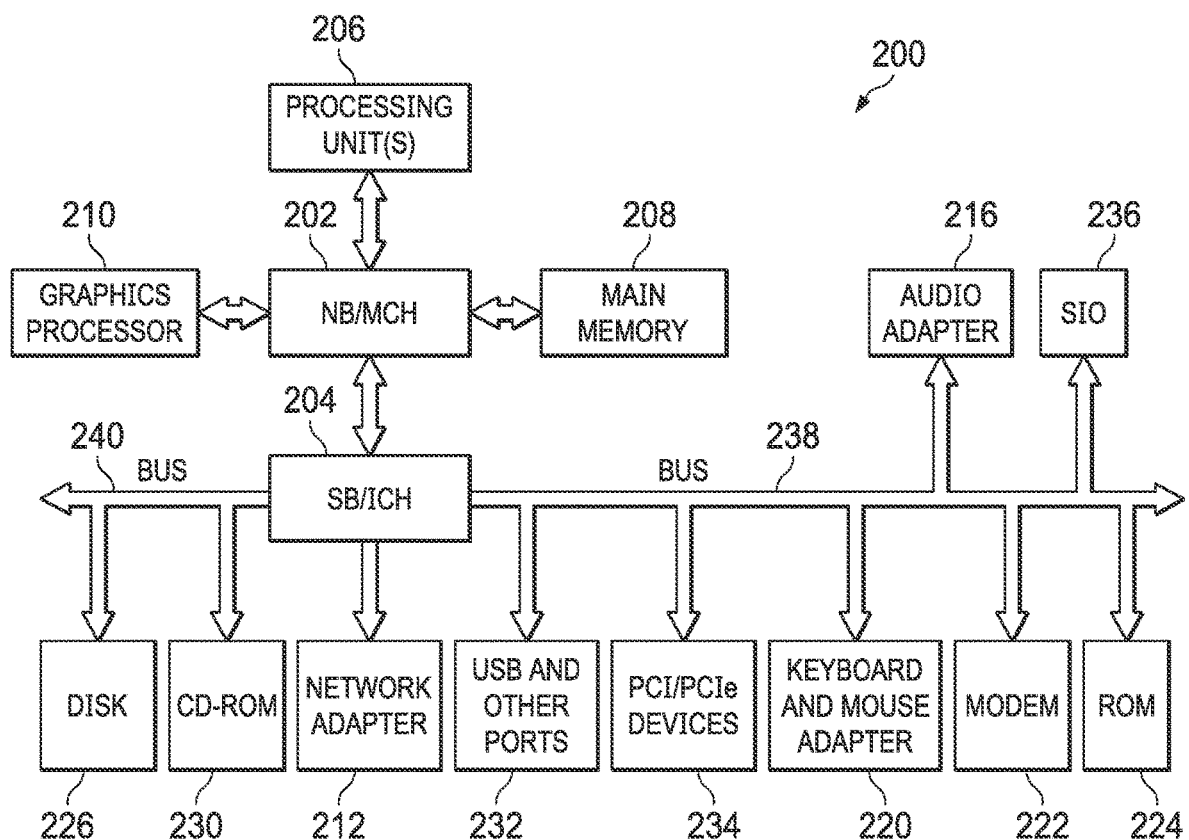
FIG. 2 is an example block diagram of a computing device in which aspects of the illustrative embodiments may be implemented.

Thus, the illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot tiles, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation tor different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, server 104, may be specifically configured to implement an action-object interaction detection mechanism for recognizing action-object actions in cluttered video scenes by leveraging existing datasets. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general purpose computing device. Moreover, as described hereafter, the implementation of the mechanisms of the illustrative embodiments improves the functionality of the computing device and provides a useful and concrete result that facilitates improved action-object recognition in cluttered video scenes utilizing existing datasets.

As noted above, the mechanisms of the illustrative embodiments utilize specifically configured computing devices, or data processing systems, to perform the operations for recognizing action-objects actions in cluttered video scenes by leveraging existing datasets. These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226. CD-ROM drive 230, universal serial bus (USB) ports and other communication ports 232, and PCI/PCIe devices 234 connect to SB/ICH 204 through bus 238 and bus 240. PCI/PCIe devices may include, tor example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SK)) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows 10®. An object-oriented programming system, such as the Java™ programming system, may run in conjunction with the operating system and provides calls to the operating system from Java® programs or applications executing on data processing system 200.

As a server, data processing system 200 may be, for example, an IBM eServer™ System p® computer system, Power™ processor based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to the recognizing action-object actions in cluttered video scenes by leveraging existing datasets.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
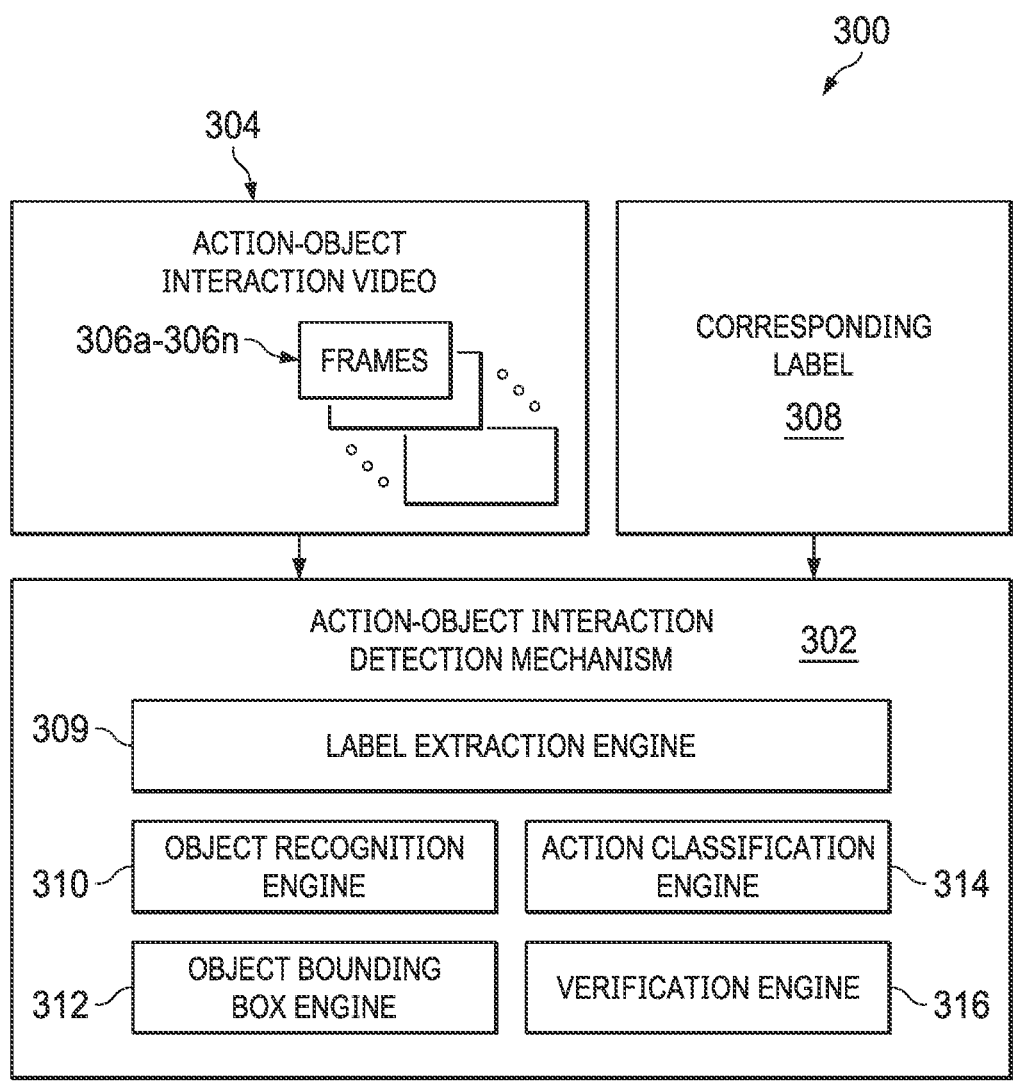
FIG. 3 depicts a functional block diagram of action-object interaction detection mechanism for recognizing actions in cluttered video scenes by leveraging existing datasets in accordance with an illustrative embodiment.

FIG. 3 depicts a functional block diagram of action-object interaction detection mechanism for recognizing actions in cluttered video scenes by leveraging existing datasets in accordance with an illustrative embodiment. Data processing system 300 comprises action-object interaction detection mechanism 302 which receives as input action-object interaction video 304, comprising one or more frames 306a-306n and corresponding label 308 associated with action-object interaction video 304. Action-object interaction detection mechanism 302 is to output a determination as to whether or not the action taking place in action-object interaction video 304 matches the action in the corresponding label 308. Action-object interaction detection mechanism 302 comprises label extraction engine 309, object recognition engine 310, object bounding box engine 312, action classification engine 314, and verification engine 316.

For action-object interaction video 304 with one or more frames 306a-306n and corresponding label 308, such as "open drawer," "close drawer," "open microwave," "close refrigerator." or the like, label extraction engine 309 utilizes natural language processing to initially extract from corresponding label 308, the object of interest such as "drawer," "microwave," "refrigerator," or the like, as well as the action that is to be verified, such as "open" "close" or the like. Optionally, label extraction engine 309 then identifies a set of related objects. The need for identifying related objects is motivated by the fact that the vocabulary of objects used in the text label may be different from the set of object class labels associated with the image dataset on which the pre-trained object classifier utilized by object recognition engine 310 and object bounding box engine 312 is trained. ImageNet® is a common dataset used for pre-training object classifiers. In order to use object classification models that have been pre-trained on ImageNet® and the corresponding object class labels, object recognition engine 310 must first obtain a mapping from the object of interest extracted from the corresponding label 308 to one or more of the object class labels available in ImageNet®, For example, a commonly used ImageNet® dataset does not have an object class label corresponding to the object "drawer." For such objects, object recognition engine 310 finds related objects, for example, using an available lexical database such as WordNet®, which contains an ontology including synonyms and related objects for objects. In the example where the object is "drawer," referencing a lexical database would provide a set of related objects such as "filing cabinet." From this set of related objects, object recognition engine 310 retains the ones that are present in ImageNet®. If the dataset on which the pre-trained object classifier is trained contains the object of interest extracted from corresponding label 308 among its object class labels, the identification of a set of related objects may optionally be skipped. The object of interest extracted from the corresponding label 308 will hereafter be referred to as the object of interest or OoI. Object recognition engine 310 forms a set containing the OoI with the optional addition of or substitution with its set of related objects, where the members of the set are present among the object class labels associated with the dataset on which the pre-trained object classifier utilized by object recognition engine 310 and object bounding box engine 312 is trained. The formed set will hereafter be referred to as the classifier OoI set. In accordance with the illustrative embodiments, an unseen object is an object where there are insufficient views of the object in one or more rich datasets, such as ImageNet®, leading to incorrect prediction by robust pre-trained object models. Such unseen object views typically arise from state changes of an object during the course of an action, such as the states of the "filing cabinet" during an "open" action. In accordance with the illustrative embodiments, an unseen action-object interaction is an interaction where there are insufficient examples of the action being performed on an object.

As would be understood by one skilled in the art, an object classifier commonly outputs a probability indicating object presence for each object class on which it is trained. Similarly, using known techniques, a heatmap can be computed that highlights the pixels that are responsible for the identification of each object for which the object classifier outputs a probability. It is possible that the classifier OoI set has cardinality greater than one. Throughout this description, where a probability that the OoI appears in a video frame or a region in the frame is determined, that probability is determined as the maximum probability over the probabilities associated with the one or more objects in the classifier OoI set. Similarly, when a heatmap is created that identifies the pixels responsible for the identification of the OoI in a video frame or a region in the frame, the object class corresponding to the maximum probability over the probabilities associated with the one or more objects in the classifier OoI set is used to compute the heatmap. The terms 'region in a or the frame' and 'frame region' are used interchangeably.

Utilizing the OoI, object recognition engine 310 processes the frames from action-object interaction video 304 and determines if OoI is present in the one or more frames 306a-306n. Specifically, for each extracted frame, object recognition engine 310 computes a probability that the OoI appears in the frame, for example, using an existing object classifier trained on a dataset such as Imagenet®. Object recognition engine 310 selects the best frame as the one with the highest probability less than a predetermined selection value. Object bounding box engine 312 uses the best frame identified in 310 as the best initial frame. For the best initial frame, the object bounding box engine 312 creates a heatmap that highlights the pixels that are responsible for identification of the OoI. Such heatmaps may be computed using techniques such as, for example, the GradCam approach. Object bounding box engine 312 then identifies pixels that exceed a heatmap threshold (indicating high importance for identification of the OoI). Object bounding box engine 312 fits a rectangular contour encompassing the identified pixels. The rectangular contour is the bounding box for the OoI in the best initial frame.

Then, for each subsequent frame of the one or more frames 306a-306n following the identified best initial frame, object bounding box engine 312 propagates the bounding box from the current frame to the subsequent frame. This propagation is done using known techniques such as, for example, Generic Object Tracking Using Regression Networks (GOTURN). GOTURN is a neural network based tracker which takes as input a frame, the location of a rectangular bounding box surrounding an area of interest within this frame and a subsequent (target) frame and predicts the location of a bounding box surrounding the same area of interest within the subsequent (target) frame. Thus, GOTURN provides a mechanism to track the area around the object from frame to frame, as long as a pretrained object classifier correctly classifies the OoI in at least one frame of the video. An alternative would be to propagate the bounding box from the current frame to the subsequent frame using known computer vision techniques for object tracking.

The initial bounding box in each frame obtained this way is not a tight bounding box, but instead contains some context around the object. Note that the initial bounding box for frames subsequent to the best initial frame may be a modified version of the bounding box output by the tool used for bounding box propagation, e.g., the bounding box may be expanded or shrunk by a given percentage. Context refinement is applied to each frame with a bounding box determined during the best initial frame's bounding box determination or during bounding box propagation. Context refinement is an iterative procedure. Given a video frame, on each context refinement iteration, the object bounding box engine 312 starts with the bounding box determined so far to define a frame region. Such a frame region may be obtained for example, by cropping the video frame to include only the area enclosed by the bounding box. The frame region obtained in this way is then input to an existing trained object classifier (trained on a dataset such as ImageNet®) to compute a probability that the OoI appears in the frame region. Object bounding box engine 312 creates a heatmap that highlights the pixels that are responsible for identification of the OoI. Such heatmaps may be computed using techniques such as, for example, the GradCam approach. Object bounding box engine 312 then identifies pixels that exceed a heatmap threshold (indicating high importance for identification of the OoI). Object bounding box engine 312 fits a rectangular contour encompassing the identified pixels. Object bounding box engine 312 uses the rectangular contour to define a new bounding box, which is considered to be the bounding box for the current iteration. In an embodiment, the new bounding box is the rectangular contour itself. In an alternative embodiment, the new bounding box may be larger than the starting bounding box for the iteration, e.g., if the rectangular contour extends to the edges of the frame region input to the object classifier. The new bounding box then includes pixels that lie within the original video frame but outside the frame region input to the object classifier. At the end of each iteration, the new bounding box becomes the bounding box determined so far for the next iteration.

The object bounding box engine 312 iteratively refines the bounding box coordinates by jointly optimizing a cost function that measures change, such as a decrease, increase, or the like, in the size of the current iteration's object bounding box compared to the previous bounding box and a cost function that measures the confidence associated with the prediction that the OoI appears in the current iteration's bounding box. One example of the measure of confidence in the prediction could be entropy. Jointly optimizing the two cost functions may be carried out, for example, by optimizing a weighted sum of the two cost functions. The iterative refinement stops when a stopping criterion is met, for example, when the combined cost function reaches a predefined value, when the combined cost function stops improving sufficiently, or the like. The context refinement procedure returns a refined bounding box, e.g., the final bounding box or the bounding box giving the best value of the combined cost function over the iterations. This context refinement procedure results in a bounding box that includes a useful amount of context around the object as opposed to a tight bounding box. Object bounding box engine 312 then crops every frame with a refined bounding box to include only the part of the frame within the refined bounding box, which produces the cropped video frame. In an embodiment, the cropped video frames are placed in the order they appeared in the original video to create a cropped video.

In another embodiment, instead of propagating the bounding box from the best initial frame to subsequent frames (one pair at a time) and then applying context refinement to the best initial frame and each of the bounding boxes that result from the propagation, context refinement and subsequent bounding box propagation are performed one after the other on a pair of frames at a time. Specifically, context refinement is done on the best initial frame's heatmap-based bounding box. Then the resulting refined bounding box is propagated to the subsequent frame, for example, using a known technique such as GOTURN. The propagated bounding box is then refined using context refinement and that refined bounding box is propagated to the next frame, and so on.

Note that in either embodiment, the frames "subsequent to" the best initial frame may be those that succeed the best initial frame in the order of the frames in the video, those that precede the best initial frame in the order of the frames in the video (i.e., "subsequent" is defined in reverse video order) or both. The illustrative embodiments use "next", "subsequent" and "following" interchangeably. Frames that do not have refined bounding boxes because the context refinement procedure fails to return a bounding box (e.g., because it fails to identify any bounding box with an acceptably high-confidence prediction that the OoI appears within the bounding box) are dropped. In other words, they are not included in the set of cropped frames that are sent to the action classification engine 314.

The action classification engine 314 processes the cropped video using a pre-trained action classifier, for example, an action classifier trained on an existing dataset, such as Moments in Time. A set of action classifiers rather than a single one may be used. In an embodiment, the action classifier or classifiers outputs the probability that the action being performed in the video is a given action, where the given actions correspond to the various action classes present in the training dataset such as "open", "close" or the like. Verification engine 316 then determines whether the probability associated with the action that is to be verified, such as "open" "close" or the like, from the corresponding label 308 is equal to or exceeds a verification threshold. Responsive to verification engine 316 determining that the probability associated with the action that is to be verified from the corresponding label 308 is equal to or exceeds the verification threshold, verification engine 316 provides a confirmation that the action-object interaction video 304 performs the action that is to be verified. In the alternative, responsive to verification engine 316 determining that the probability associated with the action that is to be verified from the corresponding label 308 is below the verification threshold, verification engine 316 provides a notification that the action-object interaction video 304 fails to perform the action that is to be verified. In either instance, the verification engine 316 may also provide a probability that the action-object interaction video 304 does or does not perform the action that is to be verified. The verification threshold can be, for example, a predefined value or a predefined value adjusted based on the standard deviation of the probabilities output by the action classifier or the set of action classifiers corresponding to the action classes present in the training dataset, or the like.

Note that it may be possible for the probability associated with one or more actions in addition to the one to be verified also to be equal to or exceed the verification threshold. Ensuring the labels present in the action classifier's training dataset do not contain synonyms is good practice to avoid that situation. If it does happen, it would be possible to maintain the policy above or modify it to, for example, provide a confirmation that the action-object interaction video 304 performs the action that is to be verified from the corresponding label 308 only if the probability associated with the action that is to be verified from the corresponding label 308 is highest among the probabilities associated with all of the actions in the action classifier's training dataset. This could be implemented, for example, by setting the probabilities for all but the highest class to zero.

Figure 4A:
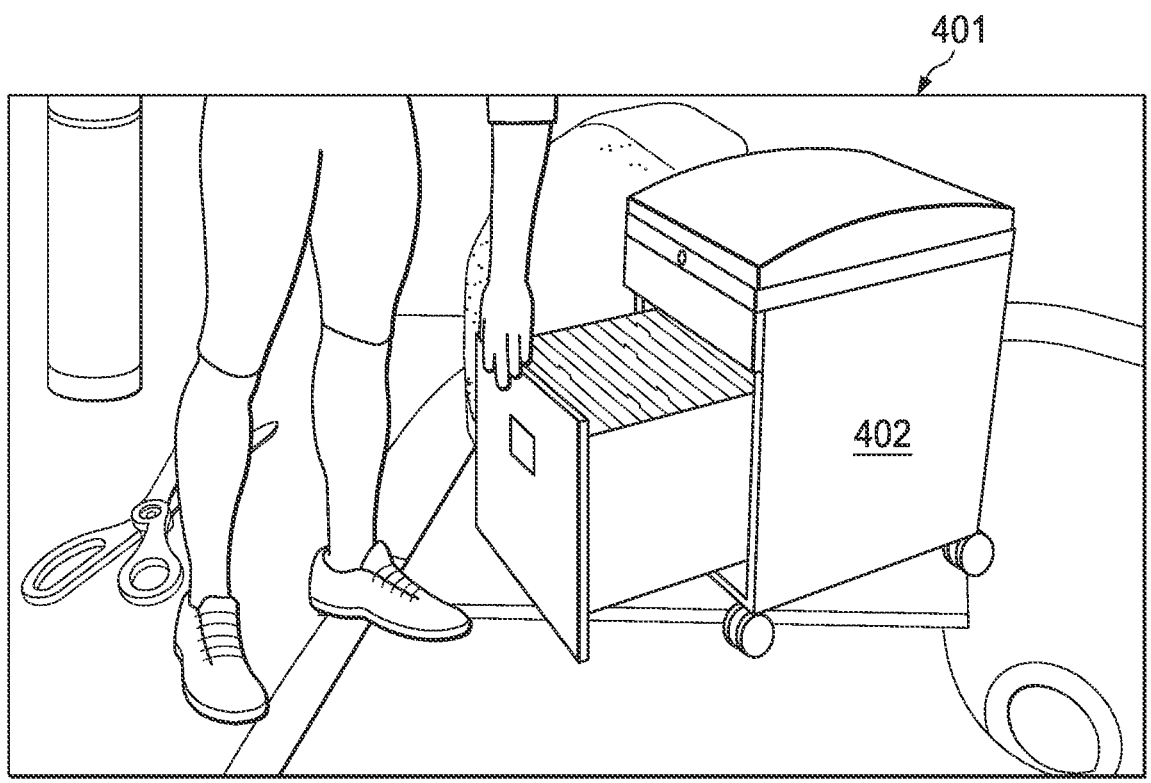
FIGS. 4A-4D depicts an exemplary process of an action-object interaction detection mechanism recognizing actions in cluttered video scenes by leveraging existing datasets in accordance with an illustrative embodiment.

FIGS. 4A-4D depict an exemplary process of an action-object interaction detection mechanism, such as action-object interaction detection mechanism 302 of FIG. 3, recognizing actions in cluttered video scenes by leveraging existing datasets in accordance with an illustrative embodiment. The action-object interaction video consists of frames that capture the action of a person closing a drawer. The input label associated with this video is "close drawer." The label extraction engine 309 determines the OoI as "drawer", the classifier OoI set as "filing cabinet" and the action to be verified as "close". In FIG. 4A, the action-object interaction detection mechanism identifies a best initial frame 401 from the action-object interaction video that includes OoI 402 with the highest probability less than a predetermined selection value. With best initial frame 401 identified, in FIG. 4B the action-object interaction detection mechanism computes a heatmap of the OoI 402 within best first frame 401 that highlights the pixels that are responsible for identification of the OoI. Such heatmaps may be computed using techniques such as, for example, the GradCam approach. Pixels are identified that exceed a heatmap threshold (indicating high importance for identification of the OoI). Object bounding box engine 312 fits a rectangular contour encompassing the identified pixels. The rectangular contour defines bounding box 404 around the OoI 402.

The context refinement procedure refines the bounding box 404 to produce the refined bounding box 404a for the OoI 402. That is, the action-object interaction detection mechanism iteratively refines the bounding box coordinates by jointly optimizing a cost function that measures change, such as a decrease, increase, or the like, in the size of the current iteration's object bounding box compared to the previous bounding box and a cost function that measures the confidence associated with the prediction that the OoI appears in the current iteration's bounding box. One example of the measure of confidence in the prediction could be entropy. Jointly optimizing the two cost functions may be carried out, for example, by optimizing a weighted sum of the two cost functions. The iterative refinement stops when a stopping criterion is met, for example, when the combined cost function reaches a predefined value, when the combined cost function stops improving sufficiently, or the like. The context refinement procedure returns a refined bounding box, e.g., the final bounding box or the bounding box giving the best value of the combined cost function over the iterations. This context refinement procedure results in a bounding box that includes a useful amount of context around the object as opposed to a tight bounding box.

Figure 4B:
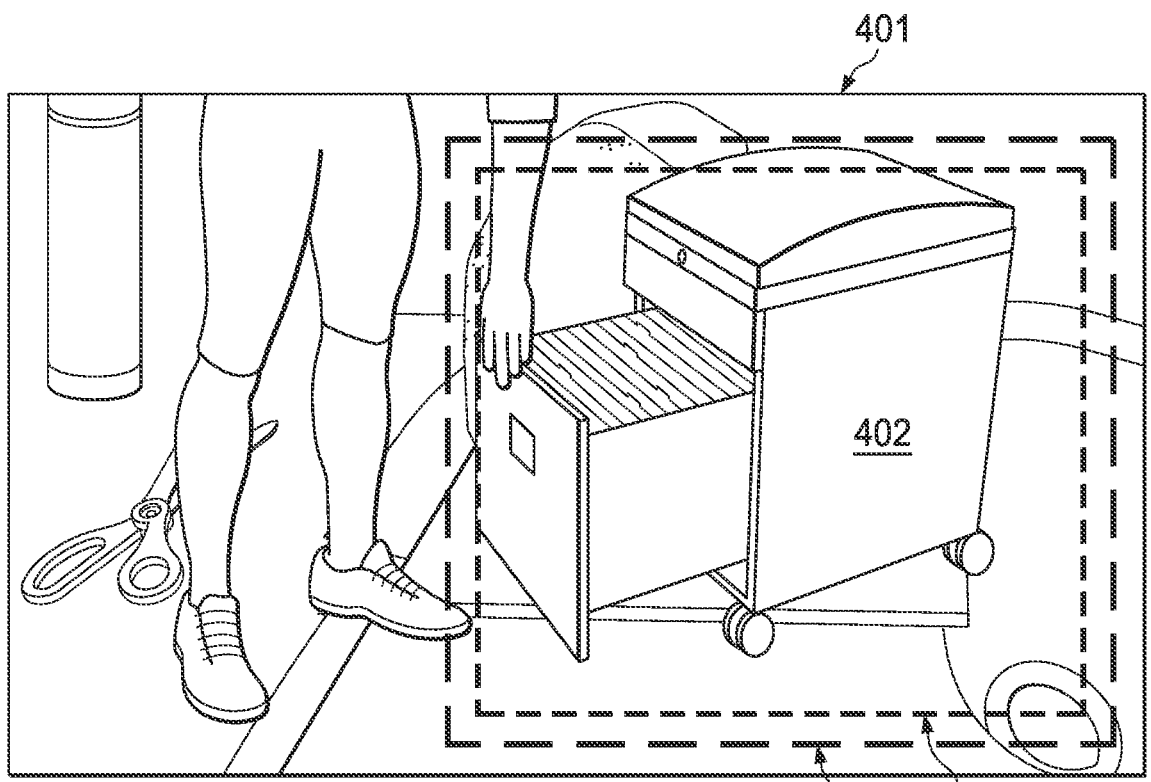
Figure 4C:
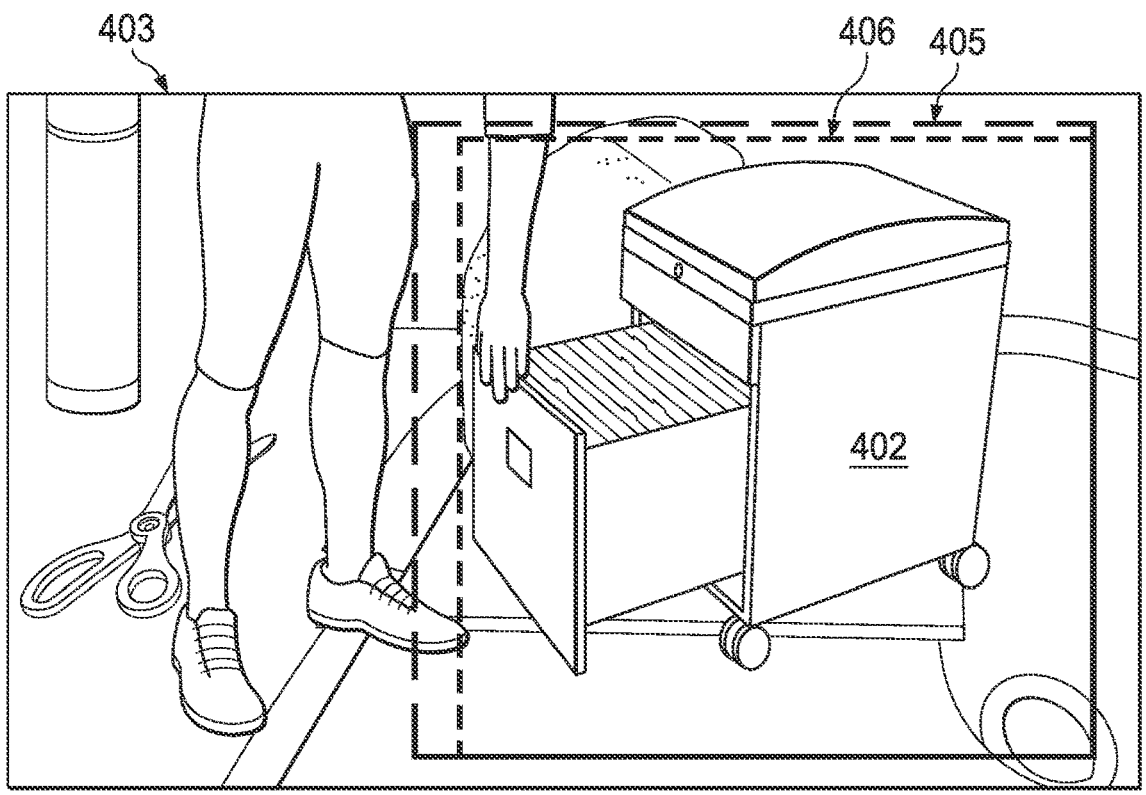

In FIG. 4C, the action-object interaction detection mechanism propagates the bounding box 404 from best initial frame 401 in FIG. 4B to frame 403 in FIG. 4C as the propagated bounding box 405. The context refinement procedure refines the bounding box 405 to produce the refined bounding box 406 for the OoI 402. That is, the action-object interaction detection mechanism iteratively refines the bounding box coordinates by jointly optimizing a cost function that measures change, such as a decrease, increase, or the like, in the size of the current iteration's object bounding box compared to the previous bounding box and a cost function that measures the confidence associated with the prediction that the OoI appears in the current iteration's bounding box. One example of the measure of confidence in the prediction could be entropy. Jointly optimizing the two cost functions may be carried out, for example, by optimizing a weighted sum of the two cost functions. The iterative refinement stops when a stopping criterion is met, for example, when the combined cost function reaches a predefined value, when the combined cost function stops improving sufficiently, or the like. The context refinement procedure returns a refined bounding box, e.g., the final bounding box or the bounding box giving the best value of the combined cost function over the iterations. This context refinement procedure results in a bounding box that includes a useful amount of context around the object as opposed to a tight bounding box.

Figure 4D:
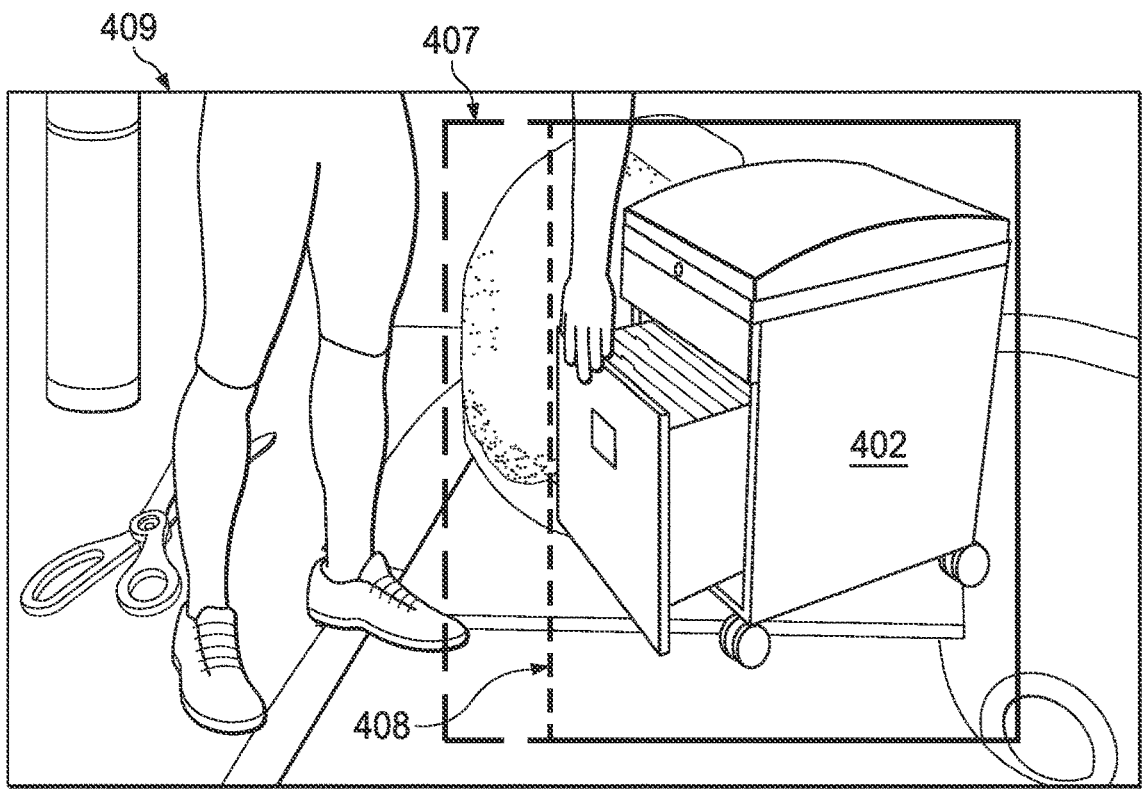

In FIG. 4D, the action-object interaction detection mechanism propagates the bounding box 405 from the frame in FIG. 4C to the frame in FIG. 4D to obtain the bounding box 407 in FIG. 4D. The context refinement procedure-refines the bounding box 407 to produce the bounding box 408 for the OoI 402. That is, the action-object interaction detection mechanism iteratively refines the bounding box coordinates by jointly optimizing a cost function that measures change, such as a decrease, increase, or the like, in the size of the current iteration's object bounding box compared to the previous bounding box and a cost function that measures the confidence associated with the prediction that the OoI appears in the current iteration's bounding box. One example of the measure of confidence in the prediction could be entropy. Jointly optimizing the two cost functions may be carried out, for example, by optimizing a weighted sum of the two cost functions. The iterative refinement stops when a stopping criterion is met, for example, when the combined cost function reaches a predefined value, when the combined cost function stops improving sufficiently, or the like. The context refinement procedure returns a refined bounding box, e.g., the final bounding box or the bounding box giving the best value of the combined cost function over the iterations. This context refinement procedure results in a bounding box that includes a useful amount of context around the object as opposed to a tight bounding box.

The object bounding box engine 312 then crops the frames with refined bounding boxes 404*a*, 406, and 408 to include only the part of the frames within the refined bounding boxes, which produces the cropped video frames. In an embodiment the cropped video frames are placed in the order they appeared in the original video to create a cropped video. The action classification engine 314 processes the cropped video using a pre-trained action classifier, for example, an action classifier trained on an existing dataset, such as Moments in Time. A set of action classifiers rather than a single one may be used. The action classification engine then assigns a probability score to the action classes, including the action class "close" and since the probability score for the action class "close" is equal to or exceeds than the verification threshold, the action is verified as "close" using the verification engine 316.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 5:
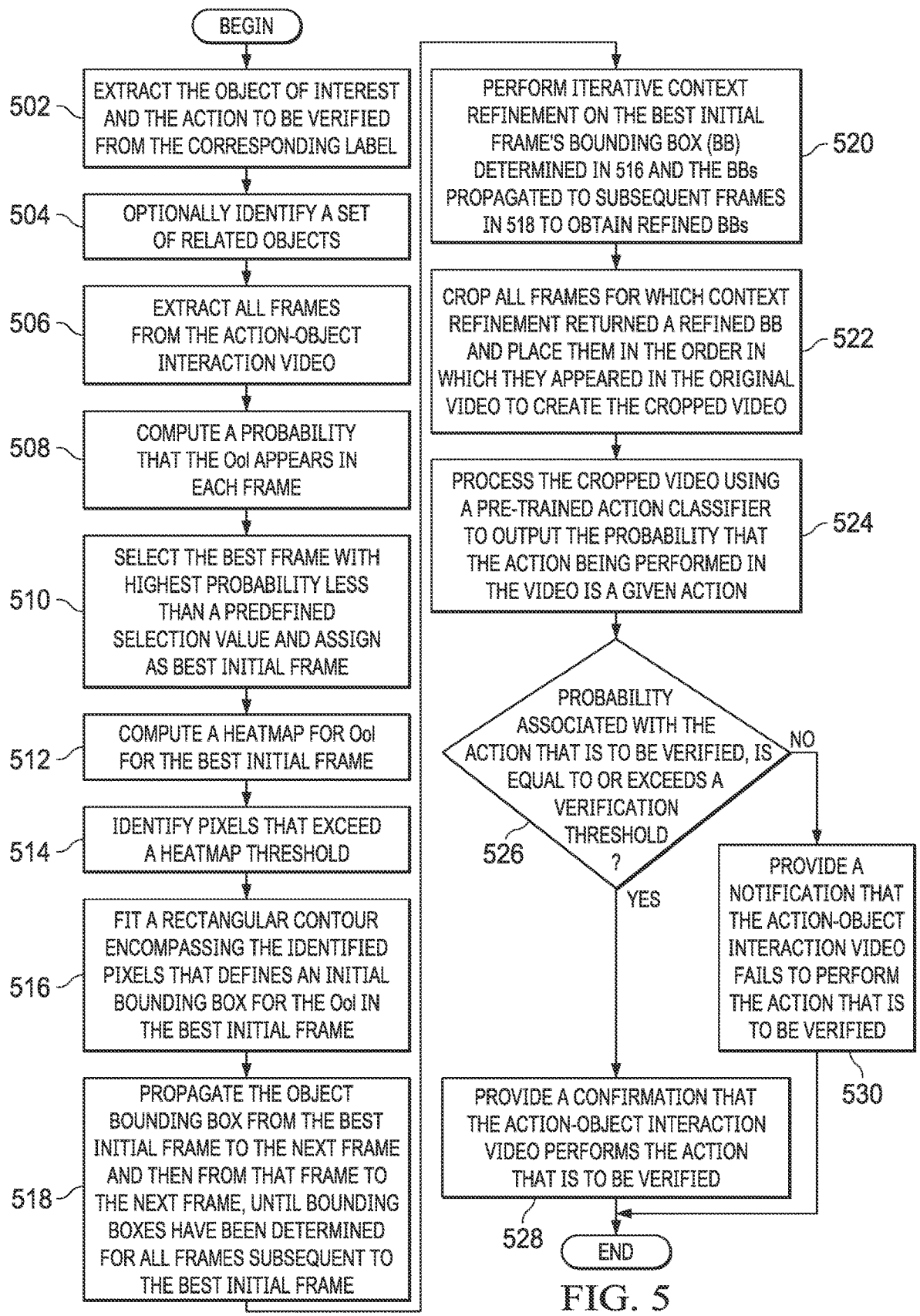
FIG. 5 depicts an exemplary flowchart of the operation performed by an action-object interaction detection mechanism in recognizing actions in cluttered video scenes by leveraging existing datasets in accordance with an illustrative embodiment.

FIG. 5 depicts an exemplary flowchart of the operation performed by an action-object interaction detection mechanism in recognizing actions in cluttered video scenes by leveraging existing datasets in accordance with an illustrative embodiment. As the operation begins, for an identified action-object interaction video with one or more frames and a corresponding label, such as "close filing cabinet," "open microwave," "close refrigerator," or the like, a label extraction engine of the action-object interaction detection mechanism extracts, from the corresponding label, the initial object of interest, such as "filing cabinet," "microwave," "refrigerator," or the like, as well as the action that is to be verified, such as "open", "close" or the like (step 502). Based on identifying the object of interest (OoI), the label extraction engine optionally identifies a set of related objects (step 504) and among the OoI and optionally the set of related objects, retains those present in the dataset on which the object classifier to be used in subsequent steps is trained, thereby forming a set of objects that comprise the classifier object of interest (OoI) set. In step 506, all the frames from the action-object interaction video are extracted. The object recognition engine then computes a probability that the OoI appears in each frame (step 508). The object recognition engine selects the best frame as the one with the highest probability less than a predetermined selection value and assigns that as the best initial frame (step 510).

For the best initial frame, the object recognition engine computes a heatmap (step 512) that highlights the pixels that are responsible for identification of the OoI. Such heatmaps may be computed using techniques such as, for example, the GradCam approach. The object recognition engine then identifies pixels that exceed a heatmap threshold (indicating high importance for identification of the OoI) (step 514). The object bounding box engine fits a rectangular contour encompassing the identified pixels, where the rectangular contour defines the initial bounding box for the OoI (step 516). The object bounding box engine then propagates the object bounding box from the best initial frame to the next frame and then from that frame to the next frame, until bounding boxes have been determined for all frames subsequent to the best initial frame (step 518). The object bound box engine then performs iterative context refinement (step 520) on the best initial frame's bounding box determined in step 516 and the bounding boxes propagated to subsequent frames in step 518 to obtain refined bounding boxes. Object bounding box engine then crops all frames for which context refinement returned a refined bounding box and places them in the order in which they appeared in the original video to create the cropped video (step 522)

Next, action-object interaction detection mechanism processes the cropped video using a pre-trained action classifier, i.e., an action classifier trained on an existing dataset, such as Moments in Time. A set of action classifiers, rather than a single one may be used. The action classifier or classifiers outputs the probability that the action being performed in the video is a given action, where the given actions correspond to the various action classes present in the training dataset such as "open", "close" or the like (step 524). The verification engine then determines whether the probability associated with the action that is to be verified, such as "open" "close" or the like, is equal to or exceeds a verification threshold (step 526). If at step 526 the verification engine determines that the probability associated with the action that is to be verified from the corresponding label is equal to or exceeds the verification threshold, the verification engine provides a confirmation that the action-object interaction video performs the action that is to be verified (step 528), with the process ending thereafter. If at step 526 the verification engine determines that the probability associated with the action that is to be verified from the corresponding label is below the verification threshold, the verification engine provides a notification that the action-object interaction video fails to perform the action that is to be verified (step 530), with the process ending thereafter. In either instance, the verification engine may also provide a probability that the action-object interaction video does or does not perform the action that is to be verified.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Thus, the illustrative embodiments provide mechanisms for action recognition in cluttered scenes with attention on action-object interaction by leveraging existing datasets. Utilizing existing pre-trained models on large datasets to action-object presence is classified in previously unseen data, through an inference-only approach. In the presence of clutter, the mechanisms focus attention on the action-object interaction. The mechanisms improve action recognition accuracy over the state of the art and do not require any task-specific data for fine-tuning or domain adaptation. Furthermore, the mechanisms work on previously unseen action-object interactions arising from state changes to an object during the course of an action, which is significant for use cases such as object compliance and verification.

Thus, the mechanisms of illustrative embodiments provide an improvement over the current action-object recognition by identifying states of an object through an automated method for finding the initial seed bounding box comprising the object. The mechanisms refine the bounding box comprising the object to include context around the object, as opposed to a tight bounding box, which are often detected by object detectors. The inclusion of context around the object is essential for improved action-object recognition, compared to the state of the art.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, wherein the at least one memory comprises instructions that are executed by the at least one processor to configure the at least one processor to implement an action-object interaction detection mechanism for recognizing actions in cluttered video scenes, the method comprising:
   processing frames in an action-object interaction video to generate an object bounding contour, associated with an object of interest, in a set of frames of the action-object interaction video;
   for each frame in the set of frames:
      refining the object bounding contour of the frame using knowledge of the object of interest thereby forming an associated refined object bounding contour; and
      cropping the frame based on the associated refined object bounding contour, thereby forming a set of cropped frames from the cropping of each frame in the set of frames; and
   generating an output indicating whether a specified action is detected as being performed in the action-object interaction video based on a processing of the set of cropped frames.

2. The method of claim 1, wherein processing frames in the action-object interaction video to generate the object bounding contour comprises:
   computing a heatmap that highlights a set of pixels that are responsible for identification of the object of interest in an initial frame of the set of frames;
   identifying pixels, in the set of pixels, that exceed a heatmap threshold; and
   generating the object bounding contour as a contour that encompassing the identified pixels, wherein the.

3. The method of claim 1, wherein refining the object bounding contour of the frame comprises iteratively until a stopping criterion is achieved:
   cropping the frame based on a presence of the object bounding contour in the frame;
   computing a heatmap that highlights pixels in the cropped frame responsible for identification of the object of interest;
   identifying pixels that exceed a heatmap threshold;
   determining a new object bounding contour based on fitting a contour to the identified pixels, where the fitted contour encompasses the identified pixels;
   computing a first metric based on a size difference between the object bounding contour and the new object bounding contour;
   determining if the stopping criterion is achieved based on a result of computing a cost function based on the first metric;
   and
   selecting one of an associated object bounding contour or a new object bounding contour to be the refined object bounding contour for the frame in response to the stopping criterion being achieved based on the cost function.

4. The method of claim 3, further comprising, in each iteration:
cropping the frame based on the new object bounding contour thereby forming a new cropped frame;
computing a probability that the object of interest appears in the new cropped frame; and
computing a second metric based on the probability that the object of interest appears in the new cropped frame, wherein the cost function is computed based on both the first metric and the second metric.

5. The method of claim 2, wherein the initial frame is identified at least by:
computing, for each of a plurality of frames in the action-object interaction video, a probability that the object of interest appears in the frame using an object classifier; and
selecting a frame as the initial frame, in response to determining that the frame has a highest probability of probabilities associated with frames in the plurality of frames, and which is less than a predetermined selection value.

6. The method of claim 5, wherein computing the probability that the object of interest appears in the frame using the object classifier comprises:
identifying from a lexical database, a set of objects related to the object of interest;
determining a subset of a set comprising the object of interest and the set of related objects where the elements of the subset correspond to the object classifier's object classes;
computing for each element of the subset a probability that an object of the object class corresponding to the element appears in the frame; and
determining the probability that the object of interest appears in the frame as the maximum over the probabilities associated with the elements of the subset.

7. The method of claim 1, wherein generating the output based on the processing of the set of cropped frames comprises:
processing the set of frames in a same order as they appear in the action-object interaction video to determine a probability that the specified action, corresponding to a label associated with the action-object interaction video, is being performed; and
responsive to the probability being below a verification threshold, providing a notification that the specified action is not being performed in the action-object interaction video.

8. The method of claim 7, wherein the output comprises a value of the probability.

9. The method of claim 1, wherein processing frames in the action-object interaction video comprises propagating the object bounding contour from an initial frame of the set of frames to a subsequent frame of the set of frames in the action-object interaction video without first refining the object bounding contour through context refinement.

10. The method of claim 1, wherein processing frames in the action-object interaction video comprises propagating the object bounding contour from an initial frame of the set of frames to a subsequent frame of the set of frames in the action-object interaction video after refining the bounding contour through context refinement.

11. A computer program product comprising a computer readable storage medium having a computer readable program stored therein, wherein the computer readable program, when executed on a computing device, causes the computing device to implement an action-object interaction detection mechanism for recognizing actions in cluttered video scenes and further causes the computing device to:
process frames in an action-object interaction video to generate an object bounding contour, associated with an object of interest, in a set of frames of the action-object interaction video;
for each frame in the set of frames:
refine the object bounding contour of the frame using knowledge of the object of interest thereby forming an associated refined object bounding contour; and
crop the frame based on the associated refined object bounding contour, thereby forming a set of cropped frames from the cropping of each frame in the set of frames; and
generate an output indicating whether a specified action is detected as being performed in the action-object interaction video based on a processing of the set of cropped frames.

12. The computer program product of claim 11, wherein the computer readable program causes the computing device to process frames in the action-object interaction video to generate the object bounding contour at least by:
computing a heatmap that highlights a set of pixels that are responsible for identification of the object of interest in an initial frame of the set of frames;
identifying pixels, in the set of pixels, that exceed a heatmap threshold; and
generating the object bounding contour as a contour that encompassing the identified pixels, wherein the.

13. The computer program product of claim 11, wherein the computer readable program causes the computing device to refine the object bounding contour of the frame at least by, iteratively until a stopping criterion is achieved:
cropping the frame based on a presence of the object bounding contour in the frame;
computing a heatmap that highlights pixels in the cropped responsible for identification of the object of interest;
identify pixels that exceed a heatmap threshold;
determining a new object bounding contour based on fitting a contour to the identified pixels, where the fitted contour encompasses the identified pixels;
computing a first metric based on a size difference between the object bounding contour and the new object bounding contour;
determining if the stopping criterion is achieved based on a result of computing a cost function based on the first metric;
and
selecting one of an associated object bounding contour or a new object bounding contour to be the refined object bounding contour for the frame in response to the stopping criterion being achieved based on the cost function.

14. The computer program product of claim 13, wherein the computer readable program further causes the computing device, in each iteration, to:
crop the frame based on the new object bounding contour thereby forming a new cropped frame;
compute a probability that the object of interest appears in the new cropped frame; and
compute a second metric based on the probability that the object of interest appears in the new cropped frame, wherein the cost function is computed based both the first metric and the second metric.

15. The computer program product of claim 12, wherein the initial frame is identified at least by:
- computing, for each of a plurality of frames in the action-object interaction video, a probability that the object of interest appears in the frame using an object classifier; and
- selecting a frame as the initial frame, in response to determining that the frame has a highest probability of probabilities associated with frames in the plurality of frames, and which is less than a predetermined selection value.

16. The computer program product of claim 15, wherein the computer readable program causes the computing device to compute the probability that the object of interest appears in the frame using the object classifier at least by:
- identifying from a lexical database, a set of objects related to the object of interest;
- determining a subset of a set comprising the object of interest and the set of related objects where the elements of the subset correspond to the object classifier's object classes;
- computing for each element of the subset a probability that an object of the object class corresponding to the element appears in the frame; and
- determining the probability that the object of interest appears in the frame as the maximum over the probabilities associated with the elements of the subset.

17. The computer program product of claim 11, wherein generating the output based on the processing of the set of cropped frames comprises:
- processing the set of frames in a same order as they appear in the action-object interaction video to determine a probability that the specified action, corresponding to a label associated with the action-object interaction video, is being performed; and
- responsive to the probability being below a verification threshold, providing a notification that the specified action is not being performed in the action-object interaction video.

18. The computer program product of claim 17, wherein the output comprises
- a value of the probability.

19. The computer program product of claim 11, wherein processing frames in the action-object interaction video comprises one of:
- propagating the object bounding contour from an initial frame of the set of frames to a subsequent frame of the set of frames in the action-object interaction video without first refining the object bounding contour through context refinement; or
- propagating the object bounding contour from an initial frame of the set of frames to a subsequent frame of the set of frames in the action-object interaction video after refining the bounding contour through context refinement.

20. An apparatus comprising:
a processor; and
a memory coupled to the processor, wherein the memory comprises instructions which, when executed by the processor, cause the processor to implement an action-object interaction detection mechanism for recognizing actions in cluttered video scenes and further cause the processor to:
process frames in an action-object interaction video to generate an object bounding contour, associated with an object of interest, in a set of frames of the action-object interaction video;
for each frame in the set of frames:
- refine the object bounding contour of the frame using knowledge of the object of interest thereby forming an associated refined object bounding contour; and
- crop the frame based on the associated refined object bounding contour, thereby forming a set of cropped frames from the cropping of each frame in the set of frames; and generate an output indicating whether a specified action is detected as being performed in the action-object interaction video based on a processing of the set of cropped frames.

* * * * *